US005711055A

United States Patent [19]

Quick

[11] Patent Number: 5,711,055

[45] Date of Patent: Jan. 27, 1998

[54] ELECTRICAL CORD STRAIN RELIEF APPARATUS

[76] Inventor: Todd N. Quick, 241 Avellana Dr., Sequim, Wash. 98382

[21] Appl. No.: 724,768

[22] Filed: Oct. 3, 1996

[51] Int. Cl.$^{6}$ .......... B23B 45/00; B65D 63/00

[52] U.S. Cl. .......... 24/16 R; 24/129 R; 24/3.13; 248/52

[58] Field of Search .......... 24/16 R, 17 AP, 24/3.1, 3.13, 298, 301, 302, 323, 326, 335, 135 R, 135 K, 129 R, 115 R, 115 K, 265 EC, 265 EE; 248/51, 52, 56

[56] References Cited

U.S. PATENT DOCUMENTS

| | | | |
|---|---|---|---|
| 2,503,124 | 4/1950 | Morton | 248/52 |
| 3,458,188 | 7/1969 | Infante | 24/3.13 X |
| 4,529,240 | 7/1985 | Engel | 24/129 R X |
| 4,549,332 | 10/1985 | Pouliot | 24/335 |
| 4,558,495 | 12/1985 | Olsen | 248/52 X |
| 4,801,136 | 1/1989 | Askins | 24/129 R X |
| 5,093,964 | 3/1992 | Rowland | 24/16 R |
| 5,318,158 | 6/1994 | Seasholtz | 248/52 X |
| 5,345,656 | 9/1994 | Merritt | 24/155 R X |
| 5,394,592 | 3/1995 | Quick | 24/16 R |
| 5,497,818 | 3/1996 | Marcarelli | 24/3.13 X |

*Primary Examiner*—Peter M. Cuomo
*Assistant Examiner*—Robert J. Sandy

[57] ABSTRACT

A cord strain relief apparatus attaches to an electrical device and includes an adjustable electrical-device-attachment assembly and a tether assembly connected to the electrical-device-attachment assembly. A handle assembly is connected to the tether assembly, and a pig tail element is connected to the handle assembly. The electrical-device-attachment assembly includes a strap and a rigid base member which includes a non-round bottom surface, a channel for receiving the strap, and tether-connection portions for connecting to the first tether assembly end of the tether assembly. The tether-connection portions of the rigid base member are comprised of wall portions of the rigid base member. The handle assembly includes a pair of duplicate handle housing portions each of which includes a pair of half-circle cord-receiver notches located along a transverse mid-line and each of which includes two pairs of auxiliary half-circle tether-receiver notches. Two pairs of the auxiliary half-circle tether-receiver notches are located on one side of the transverse mid-line, and two pairs of the auxiliary half-circle tether-receiver notches are located on the other side of the transverse mid-line. Each handle housing portion further includes a fastener receiver located on one side of the transverse mid-line and fastener-receiver channel located on the other side of the transverse mid-line. Fasteners pass through the fastener-receiver channels into the fastener receivers for securing the handle housing portions together.

12 Claims, 3 Drawing Sheets

FIG 3
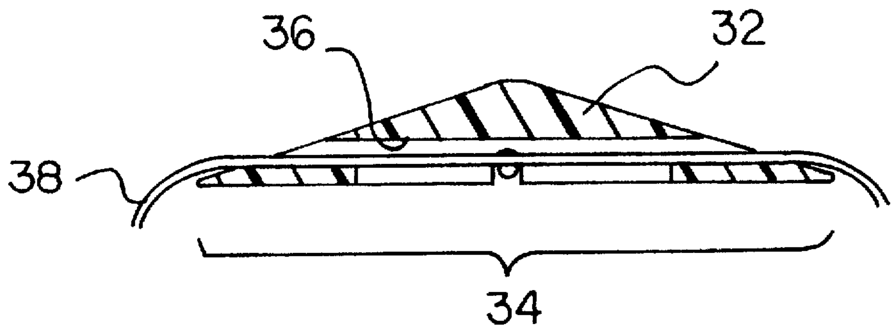
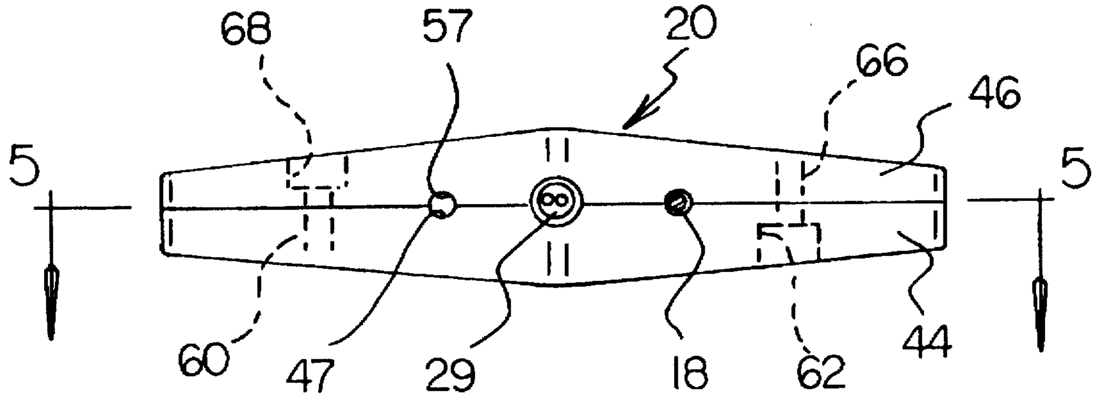
FIG 4

FIG 5
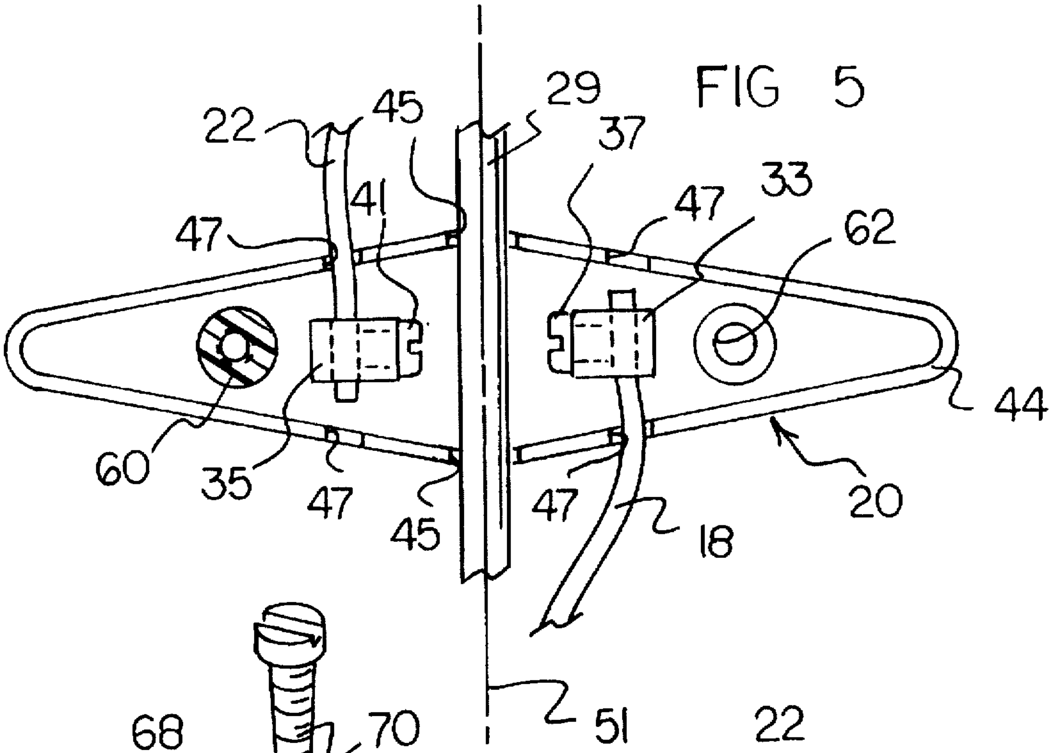
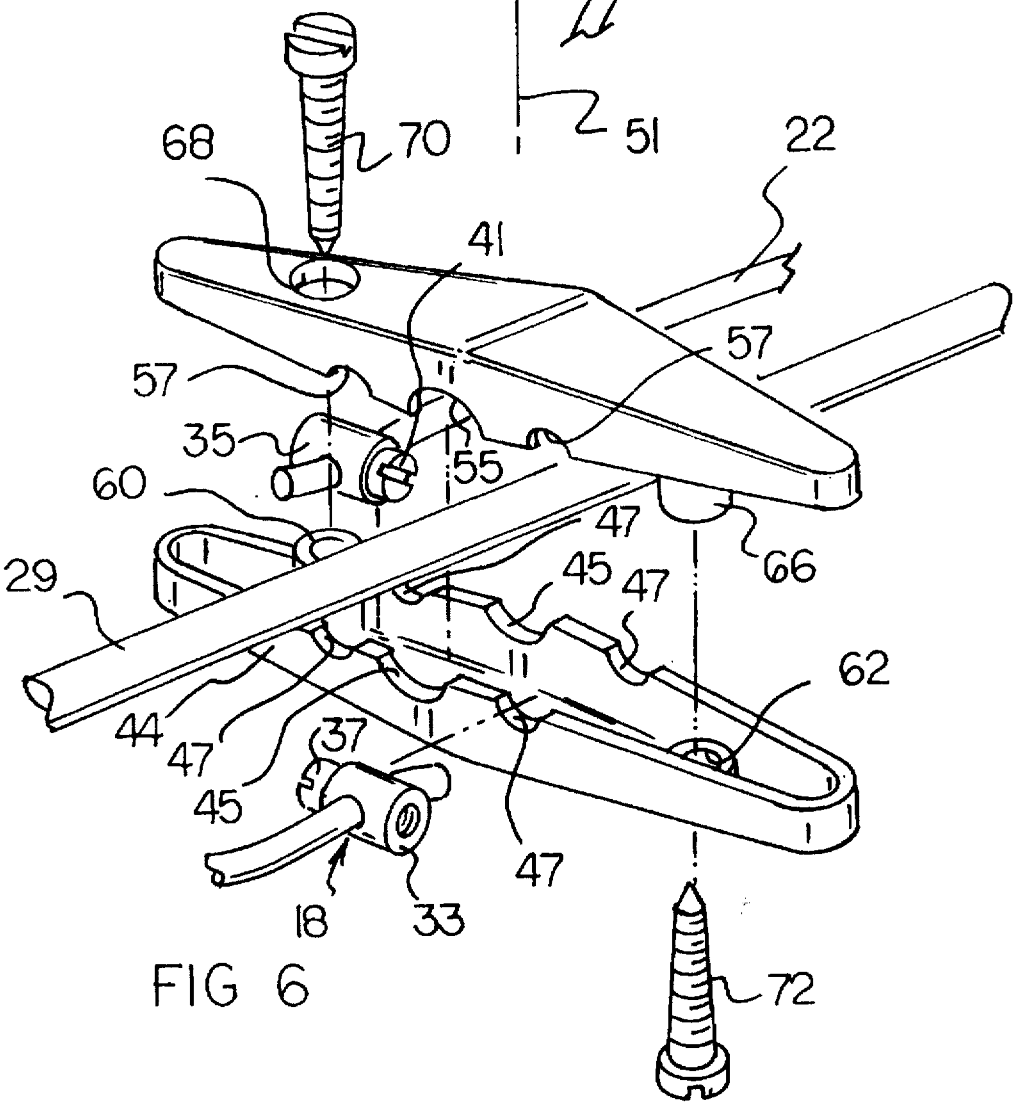
FIG 6

ELECTRICAL CORD STRAIN RELIEF APPARATUS

BACKGROUND OF THE INVENTION

1. Field of the Invention

The present invention relates generally to devices for relieving strain in electrical cords and, more particularly, to devices for relieving strain in the electrical cords of power tools.

2. Description of the Prior Art

In using electrical equipment, especially hand-held power tools, a problem that often arises is the presence of unwanted swain between the electrical equipment and the electrical cord which supplies power to the equipment. Such strains are accentuated when the equipment is moved in a direction away from an electrical outlet into which the electrical equipment is plugged. Such strains and such movements are most common when using hand-held electrically powered tools. Such strains also occur when a power tool is lowered from a height by using the power cord. In U.S. Pat. No. 5,394,592 of Quick, the same inventor herein, the problems of electrical cord swain are addressed and apparatus for relief of that strain is set forth. In this respect, U.S. Pat. No. 5,394,592 of Quick is incorporated herein by reference and made part of this application.

A number of improvements over U.S. Pat. No. 5,394,592 have been made, and said improvements are presented herein. For example, the electrical power cord for a power tool is often plugged into a socket of an extension cord rather than directly into a socket in a wall outlet. When this is the case, it would be desirable if the plug of the power tool could be secured to the socket of the extension cord.

When a worker uses an electrical power tool, the worker often works from an elevated position, such as on a ladder. When this is the case, the worker may, at times, wish to set the power tool down so that the worker can have both hands free to do other work. When such is the case, it would be desirable if the power tool could be hung from the ladder and be readily near by the next time the worker wishes to use the power tool. In this respect, it would be desirable if a cord strain relief device were provided which permits a power tool to hang from an elevated location. Moreover, for purposes of simplicity of manufacture and economy in costs, it would be desirable if a cord strain relief device were provided in which a single element were able either to secure the plug of the power tool to the socket of the extension cord or to permit the power tool to hang from an elevated location.

It is noted that in U.S. Pat. No. 5,394,592, a cable lock 26 is located outside the cord handle 24. With this arrangement, it is conceivable that the cable lock fastener 27 may be bumped up against and may be loosened thereby. In this respect, it would be desirable if a cord strain relief device were provided which includes a cable lock that is housed within a cord handle.

It is further noted that in U.S. Pat. No. 5,394,592 and anchor loop 16 is used to connect the tether cord 19 to the handle of the electrical power tool. Since the tether cord 19 is flexible and since the tether cord 19 is in direct contact with the power tool handle, the tether cord 19 can be readily slip and slide in a circumferential path around the power tool handle. Such slipping and sliding may place an undesirable torque strain on the electrical power cord. In this respect, it would be desirable if a cord strain relief device were provided with a feature that prevents slipping and sliding of an anchor loop in a circumferential path around the power tool handle.

Thus, while the foregoing indicates it to be well known to use a device to relieve cord strain in an electrical cord, the prior art described above does not teach or suggest an electrical cord strain relief apparatus which has the following combination of desirable features: (1) permits the plug of the power tool to be secured to the socket of an extension cord; (2) permits a power tool to hang from an elevated location; (3) provides a single element which is able either to secure the plug of the power tool to the socket of the extension cord or to permit the power tool to hang from an elevated location; (4) includes a cable lock that is housed within a cord handle; and (5) prevents slipping and sliding of an anchor loop in a circumferential path around the power tool handle. The foregoing desired characteristics are provided by the unique electrical cord strain relief apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a cord strain relief apparatus which attaches to an electrical device and includes an adjustable electrical-device-attachment assembly. A tether assembly is connected to the electrical-device-attachment assembly. The tether assembly includes a first tether assembly end connected to the electrical-device-attachment assembly, a mid-tether portion extending from the first tether assembly end, and a second tether assembly end extending from the mid-tether portion. A handle assembly is connected to the second tether assembly end. A pig tail element is connected to the handle assembly.

The electrical-device-attachment assembly includes a strap and a rigid base member which includes a non-round bottom surface, a channel for receiving the strap, and tether-connection portions for connecting to the first tether assembly end of the tether assembly. The tether-connection portions of the rigid base member are comprised of wall portions of the rigid base member. The wall portions of the rigid base member which serve as tether-connection portions are substantially parallel to the channel which receives the strap.

The handle assembly includes a first handle housing portion which includes a pair of first half-circle cord-receiver notches located along a transverse mid-line and includes two pairs of auxiliary first half-circle tether-receiver notches. One pair of the auxiliary first half-circle tether-receiver notches is located on one side of the transverse mid-line, and the other pair of the auxiliary first half-circle tether-receiver notches is located on the other side of the transverse mid-line. The first handle housing portion further includes a first fastener receiver located on one side of the transverse mid-line and further includes a first fastener-receiver channel located on the other side of the transverse mid-line.

A second handle housing portion includes a pair of second half-circle cord-receiver notches located along the transverse mid-line and includes two pairs of auxiliary second half-circle tether-receiver notches. One pair of the auxiliary second half-circle tether-receiver notches is located on one side of the transverse mid-line, and the other pair of the auxiliary second half-circle tether-receiver notches is located on the other side of the transverse mid-line. The second handle housing portion further includes a second fastener receiver located on one side of the transverse mid-line and further includes a second fastener-receiver channel located on the other side of the transverse mid-line. A first fastener passes through the second fastener-receiver channel into the first fastener receiver, and a second fastener passes through the first fastener-receiver channel into the second fastener receiver. Preferably, the first handle housing portion and the second handle housing portion are duplicates of each other.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for desiring other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electrical cord strain relief apparatus which has all of the advantages of the prior art and none of the disadvantages.

It is another object of the present invention to provide a new and improved electrical cord strain relief apparatus which may be easily and efficiently manufactured and marketed.

It is a further object of the present invention to provide a new and improved electrical cord strain relief apparatus which is of durable and reliable construction.

An even further object of the present invention is to provide a new and improved electrical cord strain relief apparatus which is susceptible of a low cost of manufacture with regard to both materials and labor, and which accordingly is then susceptible of low prices of sale to the consuming public, thereby making such electrical cord strain relief apparatus available to the buying public.

Still yet a further object of the present invention is to provide a new and improved electrical cord strain relief apparatus which permits the plug of the power tool to be secured to the socket of an extension cord.

Still another object of the present invention is to provide a new and improved electrical cord strain relief apparatus that permits a power tool to hang from an elevated location.

Yet another object of the present invention is to provide a new and improved electrical cord strain relief apparatus which provides a single element which is able either to secure the plug of the power tool to the socket of the extension cord or to permit the power tool to hang from an elevated location.

Even another object of the present invention is to provide a new and improved electrical cord strain relief apparatus that includes a cable lock that is housed within a cord handle.

Still a further object of the present invention is to provide a new and improved electrical cord strain relief apparatus which prevents slipping and sliding of an anchor loop in a circumferential path around the power tool handle.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is enlarged cross-sectional view of the portion of the embodiment of the electrical cord strain relief apparatus of FIG. 2 taken along line 3—3 thereof.

FIG. 4 is an enlarged plan view of the portion of FIG. 1 pointed out by line 4—4.

FIG. 5 is a cross-sectional view of the portion of the embodiment of the invention shown in FIG. 4 taken along line 5—5 of FIG. 4.

FIG. 6 is an exploded perspective view of the portion of the embodiment of the invention shown in FIG. 4.

DESCRIPTION OF THE PREFERRED EMBODIMENT

With reference to the drawings, a new and improved electrical cord strain relief apparatus embodying the principles and concepts of the present invention will be described.

Figure 1:
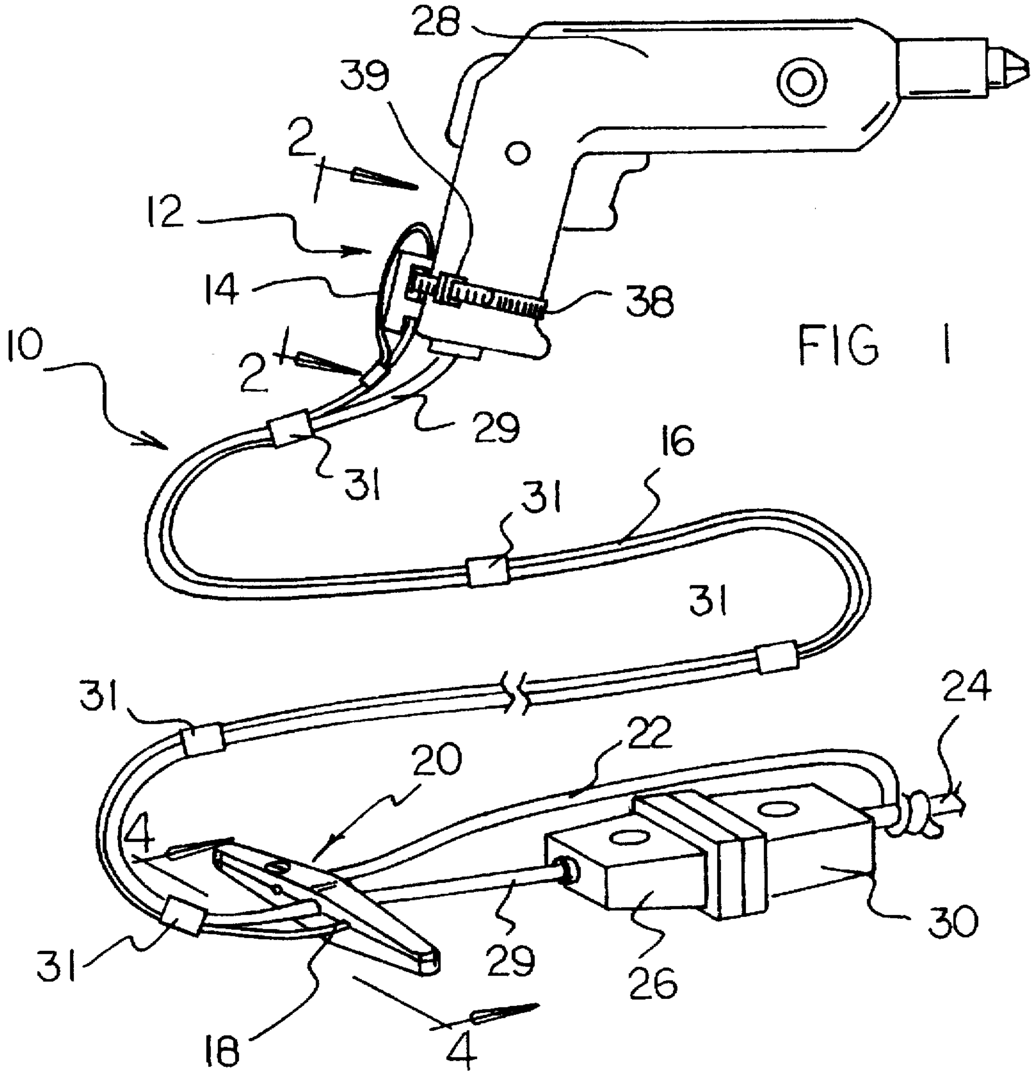
FIG. 1 is a perspective view showing a preferred embodiment of the electrical cord strain relief apparatus of the invention attached to a hand-held electrical drill and to an electrical extension cord.
Figure 2:
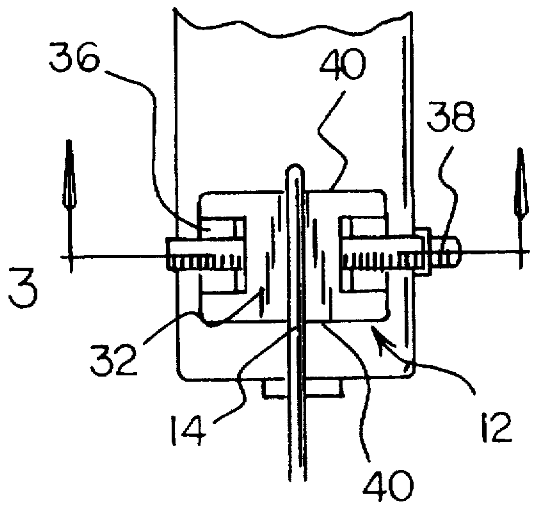
FIG. 2 is an enlarged plan view of the portion of FIG. 1 pointed out by line 2—2.

Turning to FIGS. 1–6, there is shown an exemplary embodiment of the electrical cord strain relief apparatus of the invention generally designated by reference numeral 10. In its preferred form, electrical cord strain relief apparatus 10 attaches to an electrical device and includes an adjustable electrical-device-attachment assembly 12. A tether assembly is connected to the electrical-device-attachment assembly 12. The tether assembly includes a first tether assembly end 14 connected to the electrical-device-attachment assembly 12, a mid-tether portion 16 extending from the first tether assembly end 14, and a second tether assembly end 18 extending from the mid-tether portion 16. A handle assembly 20 is connected to the second tether assembly end 18. A pig tail element 22 is connected to the handle assembly 20. The pig tail element 22 can be attached to an electrical extension cord 24 such as shown in FIG. 1 by wrapping a front portion of the pig tail element 22 around the electrical extension cord 24. Alternatively, the pig tail element 22 can be wrapped around a support device, such as a rung on a ladder (not shown). When the pig tail element 22 is wrapped onto an electrical extension cord 24, the plug 26 of the electrical device, such as the electrical drill 28, is secured to the socket 30 of the electrical extension cord 24. Alternatively, when the pig tail element 22 is wrapped around a rung on a ladder, the pig tail element 22 permits the electrical drill 28 to hang from the rung of the ladder by the cord strain relief apparatus 10 of the invention if the electrical drill 28 is released from the hand of a worker.

The electrical-device-attachment assembly 12 includes a strap 38 and a rigid base member 32 which includes a non-round bottom surface 34, a channel 36 for receiving the strap 38, and tether-connection portions for connecting to the first tether assembly end 14 of the tether assembly. The tether-connection portions of the rigid base member 32 are comprised of wall portions 40 of the rigid base member 32. The wall portions 40 include notches which receive portions of the first tether assembly end 14 formed as a loop. The wall portions 40 of the rigid base member 32 which serve as tether-connection portions are substantially parallel to the channel 36 which receives the strap 38. In this way, the loop of the first tether assembly end 14 is substantially perpendicular to the strap 38. The rigid base member 32 can be made from single piece of molded plastic.

As shown in greatest detail in FIG. 6, the handle assembly 20 includes a first handle housing portion 44 which includes a pair of first half-circle cord-receiver notches 45 located along a transverse mid-line 51 and includes two pairs of auxiliary first half-circle tether-receiver notches 47. One pair of the auxiliary first half-circle tether-receiver notches 47 is located on one side of the transverse mid-line 51, and the other pair of the auxiliary first half-circle tether-receiver notches 47 is located on the other side of the transverse mid-line 51. The first handle housing portion 44 further includes a first fastener receiver 60 located on one side of the transverse mid-line 51 and further includes a first fastener-receiver channel 62 located on the other side of the transverse mid-line 51.

A second handle housing portion 46 includes a pair of second half-circle cord-receiver notches 55 located along the transverse mid-line 51 and includes two pairs of auxiliary second half-circle tether-receiver notches 57. One pair of the auxiliary second half-circle tether-receiver notches 57 is located on one side of the transverse mid-line 51, and the other pair of the auxiliary second half-circle tether-receiver notches 57 is located on the other side of the transverse mid-line 51. The second handle housing portion 46 further includes a second fastener receiver 66 located on one side of the transverse mid-line 51 and further includes a second fastener-receiver channel 68 located on the other side of the transverse mid-line 51. A first fastener 70 passes through the second fastener-receiver channel 68 into the first fastener receiver 60, and a second fastener 72 passes through the first fastener-receiver channel 62 into the second fastener receiver 66.

As shown in the drawings, the first fastener receiver 60 and the second fastener receiver 66 can be internally threaded stand-offs, and the first fastener 70 and the second fastener 72 can be complementarily threaded screws. The first handle housing portion 44 and the second handle housing portion 46 are duplicates of each other. The first handle housing portion 44 and the second handle housing portion 46 can be made from molded plastic.

To install the cord strain relief apparatus 10 onto the handle and the cord 29 of the electrical drill 28, shown in FIG. 1, the following procedure can be followed. First, the handle assembly 20 is disassembled. That is, the first fastener 70 is removed from the first fastener receiver 60, and the second fastener 72 is removed from the second fastener receiver 66. Then, the second handle housing portion 46 is lifted off of the first handle homing portion 44. Use of the handle assembly 20 will be described below.

Then, the electrical-device-attachment assembly 12 is attached to the handle of the electrical drill 28. This is done by placing the substantially flat bottom surface 34 of the rigid base member 32 against the drill handle. Then, the strap 38 is handled to encircle the handle of the electrical drill 28. The strap 38 has its own strap lock 39, and the strap 38 is secured by the strap lock 39, whereby the electrical-device-attachment assembly 12 is securely fixed to the handle of the electrical drill 28. If desired, excess portions of the free end of the strap 38 can be cut off.

Then, the cord 29 of the electrical drill 28 is attached to the mid-tether portion 16 at six to eight inch intervals using strips 31 of an adhesive tape. It is preferred that some slack be left in the cord 29 with respect to the handle of the electrical drill 28.

Returning to the handle assembly 20, the cord 29 of the electrical drill 28 is placed in the pair of first half-circle cord-receiver notches 45. The second tether assembly end 18 is placed in one of the auxiliary first half-circle tether-receiver notches 47 so that a tether lock cylinder 33, which is fixed to the free end of the second tether assembly end 18 by tether lock screw 37, is retained by the first handle housing portion 44. Also, one end of the pig tail element 22 is placed in another of the auxiliary first half-circle tether-receiver notches 47 so that a pig tail lock cylinder 35, which is fixed to a free end of the pig tail element 22 by pig tail lock screw 41, is retained by the first handle housing portion 44.

Then, the handle assembly 20 is reassembled. That is, the second handle housing portion 46 is placed on top of the first handle housing portion 44 and in registration therewith. As a result, the second half-circle cord-receiver notches 55 are placed in registration with the auxiliary first half-circle tether-receiver notches 47, and the cord 29 is encircled by the auxiliary first half-circle tether-receiver notches 47 and the second half-circle cord-receiver notches 55. In addition, the auxiliary second half-circle tether-receiver notches 57 are placed in registration with the auxiliary first half-circle tether-receiver notches 47. As a result, the second tether assembly end 18 is encircled by one of the auxiliary first half-circle tether-receiver notches 47 and one of the auxiliary second half-circle tether-receiver notches 57, and one end of the pig tail element 22 is encircled by one of the auxiliary first half-circle tether-receiver notches 47 and one of the auxiliary second half-circle tether-receiver notches 57.

In addition, when the second handle housing portion 46 is placed in registration with the first handle housing portion 44, the second fastener-receiver channel 68 is aligned with the first fastener receiver 60, and the first fastener-receiver channel 62 is aligned with the second fastener receiver 66. The shank of the first fastener 70 is passed through the second fastener-receiver channel 68 and is screwed into the first fastener receiver 60. The shank of the second fastener 72 is passed through the first fastener-receiver channel 62 and is screwed into the second fastener receiver 66. As a result, the first handle housing portion 44 and the second handle housing portion 46 are securely fastened together, the cord 29 is retained by the handle assembly 20, the tether assembly is secured to the handle assembly 20, and the pig tail element 22 is secured to the handle assembly 20.

It is noted that the tether lock cylinder 33 is adjusted along the length of the tether assembly so that the effective length of the tether assembly is shorter than the effective length of the cord 29. In this way, the tether assembly absorbs stresses and strains between the electrical drill 28 and the handle assembly 20, and the cord 29 is protected from such stresses and strains. If desired, if there is an excessive mount of the second tether assembly end 18, such excess can be trimmed off once the desired position of the tether lock cylinder 33 on the second tether assembly end 18 is locked onto the second tether assembly end 18.

The cord strain relief apparatus 10 of the invention can be sold as a kit, and a roll of adhesive tape can be included in the kit to provide the strips 31 for securing the tether assembly to the cord 29. The strap 38 and strap lock 39 can be made of any suitable flexible material. More specifically the strap 38 and strap lock 39 disclosed in U.S. Pat. No. 3,186,047 and Des. Pat. No. 205,940 can be employed. In this respect, U.S. Pat. No. 3,186,047 and Des. Pat. No. 205,940 are incorporated herein by reference.

The tether assembly can be made of any suitable material that is flexible and has strong tensile strength. Preferably, the tether assembly can be made from plastic-coated metal cable. The pig tail element 22 can be made from any suitable material that is flexible and that retains an orientation into which it is bent. Stiff, plastic-coated copper wire can be employed for this purpose.

The components of the electrical cord strain relief apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved electrical cord strain relief apparatus that is low in cost, relatively simple in design and operation, and which may advantageously be used to permit the plug of the power tool to be secured to the socket of an extension cord. With the invention, an electrical cord strain relief apparatus is provided which permits a power tool to hang from an elevated location. With the invention, an electrical cord strain relief apparatus provides a single element which is able either to secure the plug of the power tool to the socket of the extension cord or to permit the power tool to hang from an elevated location. With the invention, an electrical cord strain relief apparatus is provided which includes a cable lock that is housed within a cord handle. With the invention, an electrical cord strain relief apparatus is provided which prevents slipping and sliding of an anchor loop in a circumferential path around the power tool handle.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A cord strain relief apparatus for attachment to an electrical device, wherein the cord strain relief apparatus includes an adjustable electrical-device-attachment assembly and a tether assembly connected to said electrical-device-attachment assembly, comprising:

a handle assembly connected to the tether assembly, and a pig tail element connected to said handle assembly, said handle assembly being elongated along a first axis and including first fastening means for attaching said tether assembly to said handle such that said tether assembly extends from said handle assembly along a second axis orthogonal to said first axis, said handle assembly further including second fastening means for attaching said pig tail element to said handle assembly such that said pig tail element extends along a third axis orthogonal to said first axis, and wherein said second axis and said third axis are laterally offset from each other along said first axis.

2. A cord strain relief apparatus for attachment to an electrical device, comprising:

an adjustable electrical-device-attachment assembly, a tether assembly which includes a first tether assembly end connected to said electrical-device-attachment assembly, a mid-tether portion extending from said first tether assembly end, and a second tether assembly end extending from said mid-tether portion, a handle assembly connected to said second tether assembly end, and a pig tail element connected to said handle assembly, wherein said handle assembly includes:

a first handle housing portion which includes a pair of first half-circle cord-receiver notches located along a transverse mid-line, and two pairs of auxiliary first half-circle tether-receiver notches, wherein one pair of said auxiliary first half-circle tether-receiver notches is located on one side of said transverse mid-line, and wherein the other pair of said auxiliary first half-circle tether-receiver notches is located on the other side of said transverse mid-line, wherein said first handle housing portion further includes a first fastener receiver located on one side of said transverse mid-line and further includes a first fastener-receiver channel located on the other side of said transverse mid-line, a second handle housing portion which includes a pair of second half-circle cord-receiver notches located along said transverse mid-line, and two pairs of auxiliary second half-circle tether-receiver notches, wherein one pair of said auxiliary second half-circle tether-receiver notches is located on one side of said transverse mid-line, and wherein the other pair of said auxiliary second half-circle tether-receiver notches is located on the other side of said transverse mid-line, wherein said second handle housing portion further includes a second fastener receiver located on one side of said transverse mid-line and further includes a second fastener-receiver channel located on the other side of said transverse mid-line, a first fastener for passing through said second fastener-receiver channel into said first fastener receiver, and a second fastener for passing through said first fastener-receiver channel into said second fastener receiver.

3. The apparatus of claim 2 wherein said electrical-device-attachment assembly includes:

a strap, and a rigid base member which includes a non-round bottom surface, a channel for receiving said strap, and tether-connection portions for connecting to said first tether assembly end of said tether assembly.

4. The apparatus of claim 3 wherein said non-round bottom surface is substantially flat.

5. The apparatus of claim 3 wherein said tether-connection portions of said rigid base member are comprised of wall portions of said rigid base member.

6. The apparatus of claim 5 wherein said wall portions of said rigid base member which serve as tether-connection portions are substantially parallel to said channel which receives said strap.

7. The apparatus of claim 2 wherein said first handle housing portion and said second handle housing portion are duplicates of each other.

8. A handle assembly for an electrical cord strain relief apparatus, comprising:

a first handle housing portion which includes a pair of first half-circle cord-receiver notches located along a transverse mid-line, and two pairs of auxiliary first half-circle tether-receiver notches, wherein one pair of said auxiliary first half-circle tether-receiver notches is located on one side of said transverse mid-line, and wherein the other pair of said auxiliary first half-circle tether-receiver notches is located on the other side of said transverse mid-line, wherein said first handle housing portion further includes a first fastener receiver located on one side of said transverse mid-line and farther includes a first fastener-receiver channel located on the other side of said transverse mid-line, a second handle housing portion which includes a pair of second half-circle cord-receiver notches located along said transverse mid-line, and two pairs of auxiliary second half-circle tether-receiver notches, wherein one pair of said auxiliary second half-circle tether-receiver notches is located on one side of said transverse mid-line, and wherein the other pair of said auxiliary second half-circle tether-receiver notches is located on the other side of said transverse mid-line, wherein said second handle housing portion further includes a second fastener receiver located on one side of said transverse mid-line and further includes a second fastener-receiver channel located on the other side of said transverse mid-line, a first fastener for passing through said second fastener-receiver channel into said first fastener receiver, and a second fastener for passing through said first fastener-receiver channel into said second fastener receiver.

9. The apparatus of claim 8 wherein said first handle housing portion and said second handle housing portion are duplicates of each other.

10. An electrical-device-attachment assembly for an electrical cord strain relief apparatus attachable to an electrical device, to electrical device having a handle portion, said assembly being adapted to be attached to said handle portion by a strap, said assembly comprising:

a rigid base member which includes a bottom surface adapted to engage the handle portion of the of said electrical device, a channel for receiving said strap, and tether-connection portions, wherein said tether-connection portions of said rigid base member are comprised of wall portions of said rigid base member, and wherein said wall portions of said rigid base member which serve as tether-connection portions are substantially parallel to said strap receiving channel, said tether connection portions further including a groove in said bottom surface of said base member such that a tether is adapted to repose in said groove orthogonally with respect to said wall portions and said strap receiving channel when said tether is attached to said assembly.

11. The apparatus of claim 10 further including in combination therewith a strap, said strap being adapted to extend through said channel and be affixed to said handle portion of said electrical device when said tether is attached to said assembly such that said tether reposes in said groove between said strap and bottom surface of said assembly.

12. A cord strain relief apparatus for attachment to an electrical device, comprising:

an electrical-device-attachment assembly which includes a strap, and a rigid base member which includes a non-round bottom surface, a channel for receiving said strap, and tether-connection portions, a handle assembly which includes a first handle housing portion which includes a pair of first half-circle cord-receiver notches located along a transverse mid-line, and two pairs of auxiliary first half-circle tether-receiver notches, wherein one pair of said auxiliary first half-circle tether-receiver notches is located on one side of said transverse mid-line, and wherein the other pair of said auxiliary first half-circle tether-receiver notches is located on the other side of said transverse mid-line, wherein said first handle housing portion further includes a first fastener receiver located on one side of said transverse mid-line and further includes a first fastener-receiver channel located on the other side of said transverse mid-line, a second handle housing portion which includes a pair of second half-circle cord-receiver notches located along said transverse mid-line, and two pairs of auxiliary second half-circle tether-receiver notches, wherein one pair of said auxiliary second half-circle tether-receiver notches is located on one side of said transverse mid-line, and wherein the other pair of said auxiliary second half-circle tether-receiver notches is located on the other side of said transverse mid-line, wherein said second handle housing portion further includes a second fastener receiver located on one side of said transverse mid-line and further includes a second fastener-receiver channel located on the other side of said transverse mid-line, a first fastener for passing through said second fastener-receiver channel into said first fastener receiver, and a second fastener for passing through said first fastener-receiver channel into said second fastener receiver, and a tether assembly connected between said rigid base member of said electrical-device-attachment assembly and one of said auxiliary first half-circle tether-receiver notches and one of said auxiliary second half-circle tether-receiver notches, in registration of said handle assembly.

* * * * *